US008291995B1

(12) United States Patent
Stoklasa

(10) Patent No.: US 8,291,995 B1
(45) Date of Patent: Oct. 23, 2012

(54) ROOT WHACKER TOOL

(76) Inventor: Joanne Stoklasa, Hammond, IN (US)

( * ) Notice: Subject to any disclaimer, the term of this patent is extended or adjusted under 35 U.S.C. 154(b) by 278 days.

(21) Appl. No.: 12/777,009

(22) Filed: May 10, 2010

(51) Int. Cl.
*A01B 1/00* (2006.01)

(52) U.S. Cl. ............... 172/371; 7/114; 81/463; 173/128

(58) Field of Classification Search ............ 172/22, 172/371; 111/985, 96, 95; 173/128, 132, 173/133; 81/463; 144/195.5; 294/60; D8/10; 171/27; 7/114, 115, 116, 143, 144, 145
See application file for complete search history.

(56) References Cited

U.S. PATENT DOCUMENTS

| 875,940 | A | * | 1/1908 | Mason ............................. 30/168 |
| 1,110,969 | A | * | 9/1914 | Stacy ................................ 7/145 |
| 1,541,373 | A | * | 6/1925 | Micek ............................... 7/167 |
| 2,475,041 | A | * | 7/1949 | Mattson ........................ 173/132 |
| 2,629,985 | A | * | 3/1953 | McDowell ...................... 173/91 |
| 2,998,087 | A | * | 8/1961 | Iddings .......................... 173/102 |
| 3,381,763 | A | * | 5/1968 | Matson ........................... 173/91 |
| 3,865,055 | A | | 2/1975 | Gilbaugh |
| 4,211,264 | A | | 7/1980 | Cross |
| D257,575 | S | | 12/1980 | Ideen |
| 4,294,298 | A | * | 10/1981 | Otte, Jr. ...................... 144/195.5 |
| 4,429,727 | A | | 2/1984 | Wilson |
| 4,458,415 | A | * | 7/1984 | Maher et al. ................. 30/164.6 |
| 4,470,440 | A | * | 9/1984 | Thor .......................... 144/195.5 |
| 4,676,538 | A | * | 6/1987 | Fiedler ............................. 294/50 |
| 5,109,739 | A | * | 5/1992 | Hull et al. ....................... 81/463 |
| 5,248,002 | A | * | 9/1993 | Williams .......................... 173/1 |
| 5,338,078 | A | * | 8/1994 | Basek .......................... 294/50.5 |
| 5,370,192 | A | * | 12/1994 | Evinger .......................... 173/90 |
| 5,495,878 | A | | 3/1996 | McKenen, Jr. |
| 5,699,864 | A | * | 12/1997 | Dvorak et al. .................. 173/91 |
| 6,357,067 | B1 | * | 3/2002 | Jones ............................... 7/116 |
| 6,662,879 | B1 | * | 12/2003 | Costa .............................. 172/22 |
| 6,769,182 | B1 | * | 8/2004 | McCabe ...................... 30/164.6 |
| 7,191,685 | B2 | * | 3/2007 | Lowther .......................... 81/27 |
| 7,681,317 | B2 | * | 3/2010 | Fagan ............................ 30/167 |
| 2004/0035496 | A1 | | 2/2004 | Ritzmann |

* cited by examiner

*Primary Examiner* — Jamie L McGowan
(74) *Attorney, Agent, or Firm* — Kyle Fletcher

(57) ABSTRACT

The root wacker tool is a manually operated hand tool that includes a shaft of which mounted thereon is a hammer cap for imparting a force into a blade located about an opposite end of the shaft, which is useful in the cutting of roots or stumps located within compacted soil. The slide hammer has a mushroom shape to form a finger guard, and can be disengaged from the shaft to connect to a handle accessory to form a sledge hammer. The handle accessory can be connected to the shaft for use as a root whacker tool or attached to the blade to form an ax. An accessory saw can be stored within the shaft when not in use, and can be attached to the handle accessory for use as a saw. The shaft is aligned above the desired cutting surface via a slide hammer that slides vertically about the shaft, and a footplate, which secures the blade with respect to the shaft.

17 Claims, 5 Drawing Sheets

ROOT WHACKER TOOL

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of hand tools, more specifically, a hand tool designed for splitting stumps and roots and of which other hand tools are formed from components of the root wacker tool.

B. Discussion of the Prior Art

As a preliminary note, it should be stated that there is an ample amount of prior art that deals with hand tools. As will be discussed immediately below, no prior art discloses a hand tool that uses a slide hammer and hammer cap that is struck by a hammer to engage a blade into a stump or root for extraction from the ground, and wherein the blade is aligned atop the stump or root via the slide hammer and foot plate, and wherein a handle accessory attaches for use with the whacker tool and of which can be dis-attached and connected to either the slide hammer or blade to form other hand tools comprising a sledge hammer or ax, and of which a saw accessory can be extracted from the tool.

The Ritzmann Patent Application Publication (U.S. Pub. No. 2004/0035496) discloses a wood splitter comprising a splitting wedge and an impact weight slidable along the length of the rod to drive the wedge through the log to be split. However, the rod does not have a hammer cap attached thereon from which a hammer or mallet strikes said hammer cap to impart a force upon a blade that cuts into a root or stump located in or upon compacted soil.

The McKeen, Jr. Patent (U.S. Pat. No. 5,495,878) discloses a hand held log splitter consisting of a reciprocating slide hammer device with alternate cutting tools including a root cutter that are removably coupled to the shaft through a quick release collar system. However, the log splitter is not designed for use with roots or stumps located in compacted ground, and of which involves a hammer cap atop the shaft from which a hammer or mallet strikes said hammer cap in order to impart a force into a blade that cuts the root or stump, and of which is aligned via a slide hammer and foot plate.

The Gilbaugh Patent (U.S. Pat. No. 3,865,055) discloses a plant transplanter comprising a cross bar handle, a plant entry blade capable of cutting roots, and a reciprocating slide frame for the plant ejector. However, the plant transplanter is not suitable for cutting roots or stump positioned within compacted ground, and comprises a blade that cuts via a force applied by a hammer cap resting upon a shaft of which a slide hammer is located for use in alignment along with a foot plate.

The Wilson Patent (U.S. Pat. No. 4,429,727) discloses a log splitter formed of a vertically arranged tube, within which a metal rod is telescopically slidably fitted. However, the log splitter does not include a blade mounted upon a shaft having a foot plate and slide hammer for alignment thereof, and of which is imparted a driving force via a hammer cap resting atop said shaft.

The Cross Patent (U.S. Pat. No. 4,211,264) discloses a log splitter comprising a telescoping member slidably mounted on a post with a wedge, and a laterally extended plate for driving the wedge through the log. However, the log splitter is not suitable for cutting roots or stump positioned within compacted ground, and comprises a blade that cuts via a force applied by a hammer cap resting upon a shaft of which a slide hammer is located for use in alignment along with a foot plate.

The Ideen Patent (U.S. Pat. No. Des. 257,575) illustrates a design for a wood splitter, which does not depict a foot plate, slide hammer, or hammer cap for use in engaging and cutting roots and/or stumps located within compacted soil.

While the above-described devices fulfill their respective and particular objects and requirements, they do not describe a hand tool that uses a slide hammer and hammer cap that is struck by a hammer to engage a blade into a stump or root for extraction from the ground, and wherein the blade is aligned atop the stump or root via the slide hammer and foot plate, and wherein a handle accessory attaches for use with the whacker tool and of which can be detached and connected to either the slide hammer or blade to form other hand tools comprising a sledge hammer or ax, and of which a saw accessory can be extracted from the tool. In this regard, the root wacker tool departs from the conventional concepts and designs of the prior art.

SUMMARY OF THE INVENTION

The root wacker tool is a manually operated hand tool that includes a shaft of which mounted thereon is a hammer cap for imparting a force into a blade located about an opposite end of the shaft, which is useful in the cutting of roots or stumps located within compacted soil. The slide hammer has a mushroom shape to form a finger guard, and can be disengaged from the shaft to connect to a handle accessory to form a sledge hammer. The handle accessory can be connected to the shaft for use as a root whacker tool or attached to the blade to form an ax. An accessory saw can be stored within the shaft when not in use, and can be attached to the handle accessory for use as a saw. The shaft is aligned above the desired cutting surface via a slide hammer that slides vertically about the shaft, and a footplate, which secures the blade with respect to the shaft.

It is an object of the invention to provide a manually operated hand tool that can be used to cut through roots, stumps or other wooden debris that is buried within compacted soil.

A further object of the invention is to provide a hand tool for cutting wood whereby a hammer cap is impacted by a hammer, mallet, or like tool for imparting a driving force upon a blade against the desired surface to be cut.

A further object of the invention is to provide alignment means comprising a slide hammer that slides vertically about the shaft and a footplate.

A further object of the invention is to provide a finger guard near a top end of the hammer cap via a mushroom shaped hammer cap so as to protect fingers from collision with a hammer or mallet.

Another object of the invention is to provide a handle accessory that attaches onto the shaft to form a wacker tool, which can be disconnected from the shaft and attached to other parts of the whacker tool to form other hand tools comprising a sledge hammer when connected to the slide hammer, an ax when connected to the blade, or a saw when connected to the saw accessory.

Another object of the invention is to include a footplate that connects to a bottom end of the shaft, and of which provides a means of connection for a blade that can be removed or installed thereon.

Another object of the invention is to provide a spring lock pin that insures that the blade does not become disengaged from the footplate when in use.

Another object of the invention is to provide a footplate having a plurality of spikes along a top surface so as to form traction for use in stepping upon the foot plate.

Another object of the invention is to store the saw accessory within the shaft when not in use.

These together with additional objects, features and advantages of the root wacker tool will be readily apparent to those of ordinary skill in the art upon reading the following detailed description of presently preferred, but nonetheless illustrative, embodiments of the root wacker tool when taken in conjunction with the accompanying drawings.

In this respect, before explaining the current embodiments of the root wacker tool in detail, it is to be understood that the root wacker tool is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the root wacker tool. It is therefore important that the claims be regarded as including such equivalent construction insofar as they do not depart from the spirit and scope of the root wacker tool. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
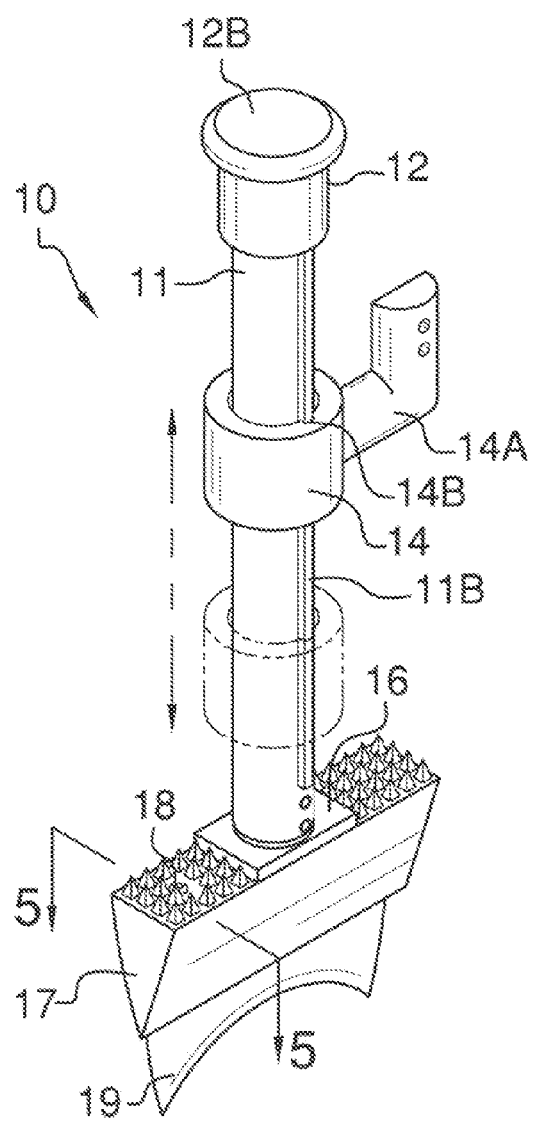
FIG. 1 illustrates a top, isometric view of the root wacker tool by itself with the slide hammer positioned about halfway up the length of the shaft and depicting movement thereon via a vertically oriented arrow.
Figure 2:
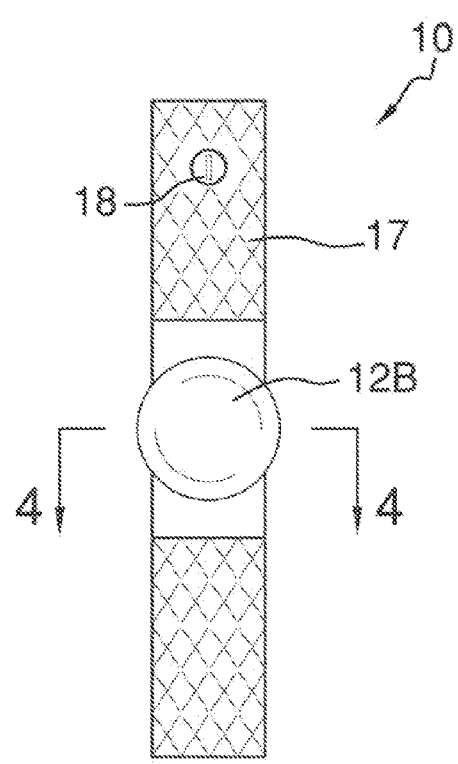
FIG. 2 illustrates a top view of the root wacker tool and detailing the hammer cap and spiked tread surface and locking pin located on the foot plate.
Figure 3:
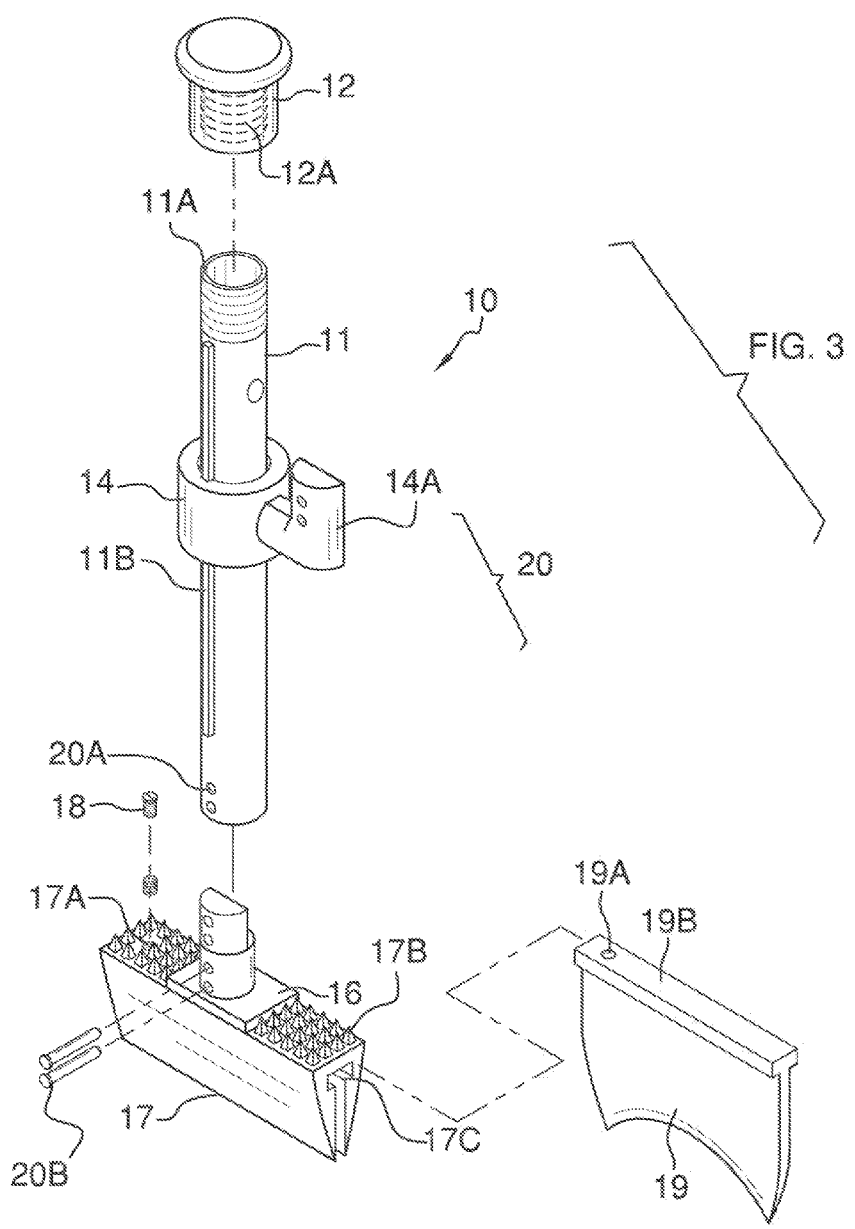
FIG. 3 illustrates an exploded view of the root wacker tool with the hammer cap unscrewed from the shaft, the shaft disassembled from both the hammer cap and the foot plate, the spring lock screw disconnected from the hammer plate, and the blade disconnected from the hammer plate.
Figure 4:
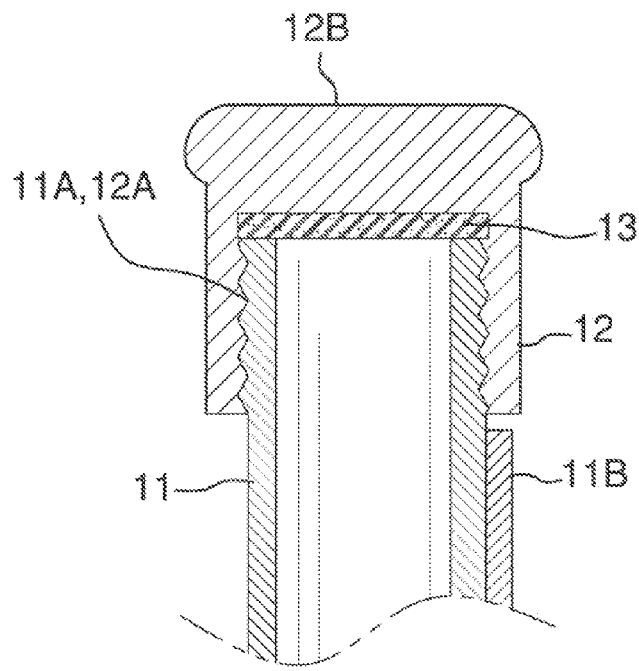
FIG. 4 illustrates a cross-sectional view of the root wacker tool along line 4-4 in FIG. 2, and detailing the hammer cap screwed onto the shaft.
Figure 5:
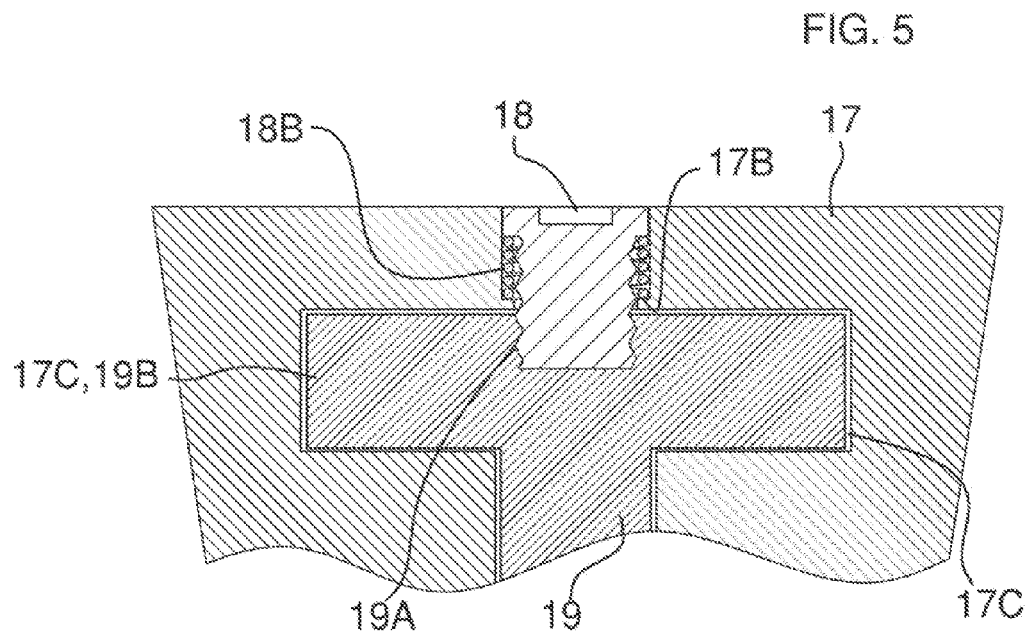
FIG. 5 illustrates a cross-sectional view of the root wacker tool along line 5-5 in FIG. 1 and further detailing how the spring-lock pin screws into both the foot plate and the blade along with detail directed to the spring positioned between the foot plate and the screw.
Figure 6:
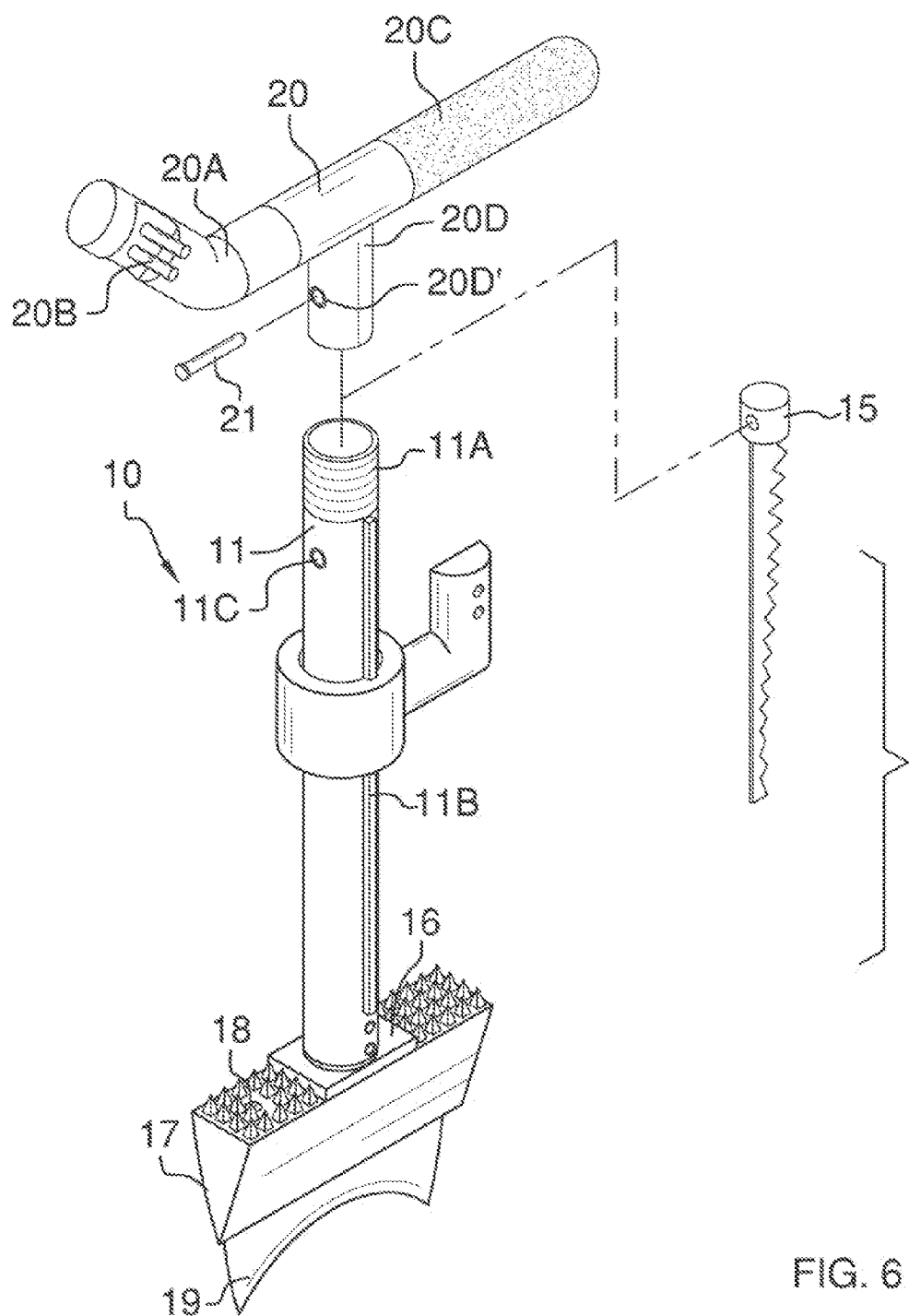
FIG. 6 illustrates an exploded view of the root wacker tool with the handle accessory and saw accessory disassembled from the shaft, and detailing where the saw can be stored when not in use.
Figure 7:
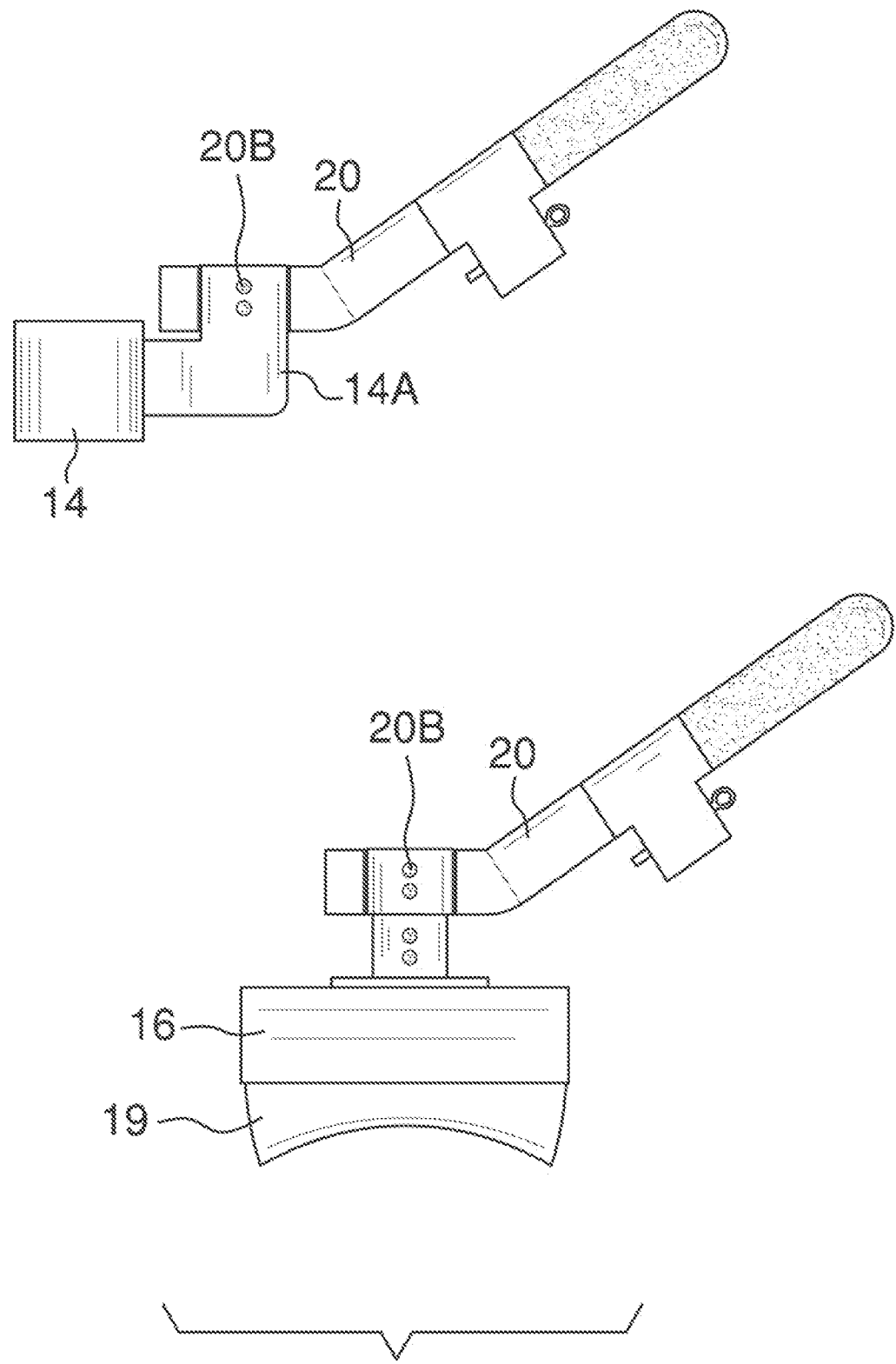
FIG. 7 illustrates a side view of the handle accessory with the slide hammer attached to form a sledge hammer hand tool and a side view of the handle accessory with the blade attached to form an ax.

Detailed reference will now be made to the preferred embodiment of the present invention, examples of which are illustrated in FIGS. 1-7. A root wacker tool 10 (hereinafter invention) includes a shaft 11, a hammer cap 12, an insert 13, a slide hammer 14, a saw accessory, a hammer plate 16, a foot plate 17, a spring lock pin 18, a blade 19, a handle accessory 20.

The shaft 11 has a threaded end 11A along a top end, which corresponds with internal threading 12A of the hammer cap 12. The shaft 11 is of hollowed, cylindrical construction that enables storage of the saw accessory 15 when not in use. The hammer cap 12 is screwed upon the shaft 11 in order for different hammer caps 12 to be installed or removed depending upon the wear of the hammer cap 12. The insert 13 is placed atop said shaft 11 prior to screwing the hammer cap 12 thereon, and acts as a means of protecting a top end of the shaft 12 from damage associated with forces in use of the invention 10. The hammer cap 12 has a mushroom-shaped top that acts as a finger guard to protect fingers under the mushroom portion of the hammer cap 12. A top surface 12B is imparted a force upon the hammer cap 12, which is translated through the shaft 11 and onto the blade 19.

The slide hammer 14 is a collar or hollowed cylinder that can traverse vertically about the shaft 11. The slide hammer 14 and the foot plate 17 are included to provide a means of aligning the blade 19 above a surface to be cut, and also to provide a means of aligning or holding the hammer cap 12 steady for impact by a hammer or mallet (not shown). The slide hammer 14 shall have an overall weight of at least four pounds. The slide hammer 14 has an arm 14A that extends for use with the handle accessory 20 to form a sledge hammer tool (see FIG. 7). The slide hammer 14 has a keyed slot 14B that corresponds to a key groove 11B located on the shaft 11, such that the slide hammer 14 does not rotate about the shaft 14, but can only slide vertically about the shaft 11.

The saw accessory 15 has a shape that enables the saw accessory 15 to be stored within the shaft 11 when not in use. However, disassembly of the invention 10, reveals that the saw accessory can be attached to the handle accessory 20 for use as a hand saw when attached to the protruding member 20D via the locking pin 20D' (see FIG. 6).

The foot plate 17 has the hammer plate 16 permanently attached about a top surface of the foot plate 17. The hammer plate 16 is permanently affixed to a button surface of the shaft 11 via locking pins 20B. The blade 19 attaches to the shaft 11 by an affixing means comprising the hammer plate 16 and the foot plate 17. Both the foot plate 17 and the shaft 11 are affixed to the hammer plate 16 via a fastening means comprising welding, casting the parts together, or molding the parts together.

The handle accessory 20 has an angled neck 20A with locking pins 20B to engage and secure the slide hammer 14 and the blade 19 thereon to form a sledge hammer and ax, respectively. However, it shall be noted that the ax formed by the handle accessory 20 and the blade 19 also requires the use of the hammer plate 16 and the foot plate 17. The handle accessory 20 has a grip 20C along a portion of the handle accessory 20 designated for use in holding the handle accessory when the hand tools (sledge hammer and ax) are formed.

A protruding member 20D extends perpendicular from the grip 20C, and has a hole 20D' for use in securing the handle accessory 20 to the shaft 11 via a pin 21 at a hole 11C located on the shaft 11.

The foot plate 17 also includes a plurality of spikes 17B across a top surface of the foot plate 17, which are used to provide traction to the foot plate when engaged by a foot (not shown) thereon.

The spring lock pin 18 is used to secure the blade 19 to the foot plate 17. Without the inclusion of the spring lock pin 18, after several strikes of the hammer cap 12, the blade 19 could slide out and separate from the foot plate 17. The spring lock pin 18 comprises a threaded bolt 18 and a spring 18B. The foot plate 17 has a threaded hole 17A with a shoulder 17B that interacts with the spring 18B to secure the spring lock pin 18 at a desired depth that will lock the blade 19 in place, via a blade hole 19A.

The inclusion of the spring lock pin 18 is an added feature of the invention 10 in that the blade 19 is secured to the foot plate 17 such that the blade 19 will not slide off of the foot plate 17 after being imparted a force via the hammer cap 12.

Both the foot plate 17 and the blade 19 have a channel 17C and 19B, respectively. The channel 17C and 19B insures that the blade 19 is secured to and aligned with the foot plate 17. It shall be noted that the channel 17C is not continuous across the entire length of the foot plate 17, which insures that the blade 19 can slide upon the channel 17C and 19B until the blade 19 is aligned with the foot plate 17.

The inclusion of the channel 17C, 19B is an added feature of the invention 10 in that the blade 19 can be installed or removed from the invention 10 for replacement or to be re-sharpened.

The shaft 11, the hammer cap 12, the slide hammer 14, the saw accessory 15, the hammer plate 16, the foot plate 17, the spring lock pin 18, the blade 19, and the handle accessory 20 are made of a material comprising a metal, a durable plastic, a wood, or carbon fiber composite.

With respect to the above description, it is to be realized that the optimum dimensional relationship for the various components of the invention 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The invention claimed is:

1. A stump or root hammering tool comprising:
a shaft, which has a hammer cap attached thereon for imparting a force thereon;
a slide hammer having a cylindrical opening that fits over the shaft such that the slide hammer can slide upon the shaft;
whereupon a blade is mounted at a bottom end of the shaft via an affixing means; and wherein the force imparts upon the blade in order to cut a material embedded within compacted soil;
wherein the hammer cap attaches upon said shaft via threading; and wherein the hammer cap has a mushroom shape that acts as a finger guard to protect fingers located underneath a top surface of the hammer cap;
wherein the affixing means comprises a foot plate for securement of the blade, and wherein the foot plate is permanently attached to a hammer plate, which attaches to a post that slides into the shaft via a shaft recess.

2. The stump or root hammering tool as described in claim 1 wherein the foot plate has a plurality of spikes along a top surface of the foot pate to act as traction for use in stepping upon the foot plate.

3. The stump or root hammering tool as described in claim 1 wherein the foot plate provides a means for aligning the blade above a surface to be cut.

4. The stump or root hammering tool as described in claim 1 wherein a channel is located on the foot plate and the blade, and wherein said channel enables the blade to be slid upon the foot plate.

5. The stump or root hammering tool as described in claim 4 wherein a spring lock pin secures the blade laterally with respect to the foot plate.

6. The stump or root hammering tool as described in claim 5 wherein the spring lock pin comprises a threaded bolt having a recess for inclusion of a spring; and wherein the foot plate has a threaded hole with a shoulder that interacts with the spring to secure the spring lock pin at a desired depth that will lock the blade in place, via a blade hole.

7. The stump or root hammering tool as described in claim 5 wherein the shaft, the hammer cap, the slide hammer, the post, the hammer plate, the foot plate, the spring lock pin, and the blade are made of a metal, plastic, carbon fiber composite, or a wood.

8. The stump or root hammering tool as described in claim 5 wherein a handle accessory can attach to the shaft in place of the hammer cap; wherein the handle accessory can be disconnected from the shaft and connected to the slide hammer to form a sledge hammer; wherein the handle accessory can be disconnected from the shaft and connected to the blade to form an ax.

9. The stump or root hammering tool as described in claim 8 wherein a saw accessory can attach to the handle accessory to form a hand saw; and wherein the saw accessory can be placed within the shaft when not in use.

10. A stump or root hammering tool comprising:
a shaft, which has a hammer cap attached thereon for imparting a force thereon;
the hammer cap attaches upon said shaft via threading; and wherein the hammer cap has a mushroom shape that acts as a finger guard to protect fingers located underneath a top surface of the hammer cap;
whereupon a blade is mounted at a bottom end of the shaft via an affixing means; and wherein the force imparts upon the blade in order to cut a material embedded within compacted soil;
wherein a slide hammer having a cylindrical opening that fits over the shaft such that the slide hammer can slide upon the shaft;
wherein the affixing means comprises a foot plate for securement of the blade, and wherein the foot plate is permanently attached to a hammer plate, which attaches to a post that slides into the shaft via a shaft recess;
wherein a handle accessory can attach to the shaft in place of the hammer cap; wherein the handle accessory can be disconnected from the shaft and connected to the slide hammer; wherein once the handle accessory is connected to the slide hammer a sledge hammer is formed; wherein the handle accessory can be disconnected from the shaft and connected to the blade; wherein once the handle accessory is connected to the blade an ax is formed;

wherein a saw accessory can attach to the handle accessory; wherein once the saw accessory is attached to the handle a hand saw is formed; and wherein the saw accessory can be placed within the shaft when not in use.

11. The stump or root hammering tool as described in claim 10 wherein the foot plate is permanently attached to a hammer plate, which attaches to a post that slides into the shaft via a shaft recess.

12. The stump or root hammering tool as described in claim 11 wherein the foot plate has a plurality of spikes along a top surface of the foot pate to act as traction for use in stepping upon the foot plate.

13. The stump or root hammering tool as described in claim 11 wherein the foot plate provides a means for aligning the blade above a surface to be cut.

14. The stump or root hammering tool as described in claim 11 wherein a channel is located on the foot plate and the blade, and wherein said channel enables the blade to be slid upon the foot plate.

15. The stump or root hammering tool as described in claim 14 wherein a spring lock pin secures the blade laterally with respect to the foot plate.

16. The stump or root hammering tool as described in claim 15 wherein the spring lock pin comprises a threaded bolt having a recess for inclusion of a spring; and wherein the foot plate has a threaded hole with a shoulder that interacts with the spring to secure the spring lock pin at a desired depth that will lock the blade in place, via a blade hole.

17. The stump or root hammering tool as described in claim 15 wherein the shaft, the hammer cap, the slide hammer, the post, the hammer plate, the foot plate, the spring lock pin, and the blade are made of a metal, plastic, carbon fiber composite, or a wood.

* * * * *